US006716448B2

(12) United States Patent
Huber et al.

(10) Patent No.: US 6,716,448 B2
(45) Date of Patent: Apr. 6, 2004

(54) DOMESTICATED HOUSEHOLD PET FOOD INCLUDING MAINTENANCE AMOUNTS OF IVERMECTIN

(75) Inventors: Gordon R. Huber, Sabetha, KS (US); David R. Jones, Palm Beach, FL (US); John C. Kuenzi, Bern, KS (US); Kevin D. Kuenzi, Perry, KS (US); Francisco A. Cabrera, Overland Park, KS (US)

(73) Assignee: Rubicon Scientific LLC, Sabetha, KS (US)

( * ) Notice: Subject to any disclaimer, the term of this patent is extended or adjusted under 35 U.S.C. 154(b) by 0 days.

(21) Appl. No.: 09/971,521

(22) Filed: Oct. 5, 2001

(65) Prior Publication Data

US 2003/0095996 A1 May 22, 2003

(51) Int. Cl.[7] .................. A61K 47/00; A23K 1/165; A23K 1/17
(52) U.S. Cl. ..................... 424/442; 424/439
(58) Field of Search ............................. 424/442, 439

(56) References Cited

U.S. PATENT DOCUMENTS

| ,721,633 A | 2/1903 | Eaton |
| 1,204,551 A | 11/1916 | Edgerton |
| 1,244,141 A | 10/1917 | Sterling |
| 2,742,394 A | 4/1956 | Davis et al. |
| 2,868,692 A | 1/1959 | Bach et al. |
| 2,893,914 A | 7/1959 | McCowen et al. |
| 3,005,753 A | 10/1961 | Vierling |
| 3,380,832 A | 4/1968 | Bone |
| 3,553,313 A | 1/1971 | Tort |
| 3,557,284 A | 1/1971 | Wilhelm et al. |
| 3,617,299 A | 11/1971 | Mattoon et al. |
| 3,686,392 A | 8/1972 | Hamada et al. |
| 3,696,189 A | 10/1972 | Snyder |
| 3,765,902 A | 10/1973 | Charter |
| 3,829,564 A | 8/1974 | Merry et al. |
| 3,857,968 A | 12/1974 | Haas et al. |
| 3,883,672 A | 5/1975 | Bone et al. |
| 3,908,025 A | 9/1975 | Miller et al. |
| 4,046,753 A | 9/1977 | Fisher et al. |
| 4,094,976 A | 6/1978 | Dybas et al. |
| 4,118,512 A | 10/1978 | Eichelburg |
| 4,199,569 A * | 4/1980 | Chabala et al. ............... 514/30 |
| 4,265,913 A | 5/1981 | Eichelburg |
| 4,348,379 A | 9/1982 | Kowalsky et al. |
| 4,597,969 A * | 7/1986 | Maxfield et al. ............ 424/692 |
| 4,643,908 A | 2/1987 | Sawhill |
| 4,713,245 A | 12/1987 | Ando et al. |
| 4,729,896 A | 3/1988 | Sawhill |
| 4,808,412 A | 2/1989 | Smith et al. |
| 4,842,862 A | 6/1989 | Jacobs et al. |
| 4,857,333 A | 8/1989 | Harold |
| 4,861,586 A | 8/1989 | Schneider et al. |
| 4,869,907 A | 9/1989 | Sasagawa |
| 4,880,632 A | 11/1989 | Lipham et al. |
| 4,948,589 A | 8/1990 | Iijima et al. |
| 4,960,589 A | 10/1990 | Sasagawa |
| 4,975,270 A | 12/1990 | Kehoe |
| 4,994,496 A | 2/1991 | Repaskey et al. |
| 4,996,055 A | 2/1991 | Kurasawa |
| 5,000,940 A | 3/1991 | Staples et al. |
| 5,000,973 A | 3/1991 | Scaglione et al. |
| 5,006,341 A | 4/1991 | Davis et al. |
| 5,015,485 A | 5/1991 | Scaglione et al. |
| 5,041,452 A | 8/1991 | White |
| 5,089,271 A | 2/1992 | Unangst |
| 5,094,870 A | 3/1992 | Scaglione et al. |
| 5,104,662 A | 4/1992 | Kalsta et al. |
| 5,152,986 A | 10/1992 | Lange et al. |
| 5,169,634 A | 12/1992 | Ellingsen et al. |
| 5,206,025 A | 4/1993 | Courteille et al. |
| 5,208,034 A | 5/1993 | Herting et al. |

FOREIGN PATENT DOCUMENTS

| WO | WO 0072698 | 12/2000 |

OTHER PUBLICATIONS

Lewis, B P et al; Veterinary Drug Index; 1982; p 25.
Merck & Co; The Merck Veterinary Manual; 1979; p 1559.
Kirk, Robert W. et al; Handbook of Veterinary Procedures and Emergency Treatment; 1975; p 553.
Lewis, Lon D. et al; Small Animal Clinical Nutrition; 1984; pp. 13–5; 13–8; 13–9; 13–12; A2–9, A2–11–A2–14.
Hills; Science Diet Dog Food Maximum Stress Diet Medicated Label; 1985; Stock No. 4180.
Morris, Mark L PhD; Nutritional Management in Gastrointestinal Disorders; Veterinary Clinics of North America—Vol 1, No 1; 1972; pp. 65; 74–77.
Morris, Mark L. et al; Dietary Management of Chronic Renal Failure in Dogs; Canine Practice Vol 5, No. 1; Feb. 1978' p. 48.
Morris, Mark L. et al; Diet and Canine Urolithiasis; Canine Practice Vol 5, No. 4; Aug. 1978; p. 53.
Morris, Mark L. PhD; Feline Dietetics; Feline Practice; Nov.–Dec. 1975; p. 39.
Twin Screw Advances; Petfood Industry; Mar./Apr. 1999.
Edited by Fox, P.F.; Developments in Dairy Chemistry–4; Functional Milk Proteins; 1989; Contents of vols. 2 and 3;pp. v; 230–231; 242–243.
Morris, Mark DVM; Small Animal Clinical Nutrition; 1984; pp. A2–12 thru 14; A3–1.

(List continued on next page.)

*Primary Examiner*—Thurman K. Page
*Assistant Examiner*—Sharon Howard
(74) *Attorney, Agent, or Firm*—Hovey Williams LLP

(57) ABSTRACT

Improved ivermectin-containing daily ration extruded feeds for domesticated household pets such as cats and dogs are provided so that a pet consuming the feeds receives quantities of ivermectin sufficient to establish and maintain substantially constant concentrations of the drug in the pet's bloodstream. The feeds are produced by extrusion with addition of minor quantities of ivermectin so as to uniformly distribute the drug throughout the extruded product. Ivermectin levels of from about 2–1500 μg/kg of extruded feed are preferred.

10 Claims, No Drawings

U.S. PATENT DOCUMENTS

| | | | |
|---|---|---|---|
| 5,281,584 A | 1/1994 | Tobey | |
| 5,314,692 A | 5/1994 | Haarasilta et al. | |
| 5,316,769 A | 5/1994 | Nakano et al. | |
| 5,316,770 A | 5/1994 | Edwards, Jr. | |
| 5,320,849 A | 6/1994 | Hagiwara et al. | |
| 5,378,471 A | 1/1995 | Smith | |
| 5,393,333 A | 2/1995 | Trouve | |
| 5,405,836 A | 4/1995 | Richar et al. | |
| 5,407,661 A | 4/1995 | Simone et al. | |
| 5,439,924 A | 8/1995 | Miller | |
| 5,516,525 A | 5/1996 | Edwards, Jr. | |
| 5,540,932 A | 7/1996 | Lanter et al. | |
| 5,578,585 A | 11/1996 | Matous et al. | |
| 5,589,187 A | 12/1996 | Wentworth et al. | |
| 5,603,945 A | 2/1997 | Iobel et al. | |
| 5,676,966 A | 10/1997 | Kitamura et al. | |
| 5,686,111 A | 11/1997 | Jalbert | |
| 5,695,794 A | 12/1997 | Stark et al. | |
| 5,720,971 A | 2/1998 | Beauchemin et al. | |
| 5,725,865 A | 3/1998 | Mane et al. | |
| 5,725,873 A | 3/1998 | Cook et al. | |
| 5,728,398 A | 3/1998 | Onishi et al. | |
| 5,738,866 A | 4/1998 | Lanter et al. | |
| 5,747,063 A | 5/1998 | Languet et al. | |
| 5,750,135 A | 5/1998 | Schleicher et al. | |
| 5,753,223 A | 5/1998 | Shibahara et al. | |
| 5,756,088 A | 5/1998 | Matsuura et al. | |
| 5,756,719 A | 5/1998 | Chaundy et al. | |
| 5,767,107 A | 6/1998 | Chaundy et al. | |
| 5,770,217 A | 6/1998 | Kutilec, III et al. | |
| 5,780,046 A | 7/1998 | Humber et al. | |
| 5,792,470 A | 8/1998 | Baumgardener, Sr. | |
| 5,795,585 A | 8/1998 | Ikeda et al. | |
| 5,840,860 A | 11/1998 | Annison et al. | |
| 5,843,922 A | 12/1998 | Whistler et al. | |
| 5,853,757 A | 12/1998 | Durand et al. | |
| 5,894,029 A | 4/1999 | Brown et al. | |
| 5,904,928 A | 5/1999 | Cyr et al. | |
| 5,908,634 A | 6/1999 | Kemp et al. | |
| 5,919,451 A | 7/1999 | Cook et al. | |
| 5,919,499 A | 7/1999 | Lawley | |
| 5,922,692 A | 7/1999 | Marino | |
| 5,948,431 A | 9/1999 | Lavery | |
| 5,958,977 A | 9/1999 | Ikeda et al. | |
| 5,962,043 A | 10/1999 | Jones et al. | |
| 5,989,600 A | 11/1999 | Nielsen et al. | |
| 6,001,384 A | 12/1999 | Jeannin | |
| 6,004,576 A | 12/1999 | Weaver et al. | |
| 6,004,585 A | 12/1999 | Grofmeyer et al. | |
| 6,017,530 A | 1/2000 | Beudeker et al. | |
| 6,022,555 A | 2/2000 | DeLuca et al. | |
| 6,030,637 A | 2/2000 | Whitehead | |
| 6,045,819 A | 4/2000 | Takebe | |
| 6,048,543 A | 4/2000 | Schneider et al. | |
| 6,077,525 A | 6/2000 | Vanderhock | |
| 6,080,419 A | 6/2000 | Stookey | |
| 6,110,511 A | 8/2000 | Rollins et al. | |
| 6,117,477 A | * 9/2000 | Paluch | 426/623 |

\* cited by examiner

US 6,716,448 B2

DOMESTICATED HOUSEHOLD PET FOOD INCLUDING MAINTENANCE AMOUNTS OF IVERMECTIN

BACKGROUND OF THE INVENTION

1. Field of the Invention

The present invention is broadly concerned with improved daily ration feed products for household pets including minor amounts of ivermectin. More particularly, the invention is concerned with such feed products, and methods of preparing the products, wherein the feeds contain a sufficient quantity of ivermectin so that when household pets consume the feeds on a daily basis, therapeutically effective amounts of ivermectin are established and maintained in the bloodstreams of the animals. In this way, conventional ivermectin dosing regimes are eliminated, and the pets receive proper quantities of ivermectin as a part of their normal diets.

2. Description of the Prior Art

Ivermectin is a known oral and injectable medication used as a wormer, heartworm preventative and to kill certain mites (mange). Ivermectin is a mixture of (10E,14E,16E, 22Z)-(1R,4S,5'S,6S,6'R,8R,12S,13S,20R,21R,24S)-6'-[(S)-sec-butyl]-21,24-dihydroxy-5',11,13,22-tetramethyl-2-oxo-(3,7,19-trioxatetracyclo[15.6.1.1$^{4,8}$.0$^{20,24}$]pentacosa-10,14, 16,22-tetraene)-6-spiro-2'-(perhydropyran)-12-yl 2,6-dideoxy-4-O-(2,6-dideoxy-3-O-methyl-αa-L-arabino-hexopyranosyl)-3-O-methyl-αa-L-arabino-hexopyranoside and (10E,14E,16E,22Z)-(1R,4S,5'S,6S,6'R,8R,12S,13S, 20R,21R,24S)-21,24-dihydroxy-6'-isopropyl-5',11,13,22-tetramethyl-2-oxo-(3,7,19-trioxatetracyclo[15.6.1.1$^{4,8}$. 0$^{20,24}$]pentacosa-10,14,16,22-tetraene)-6-spiro-2'-(perhydropyran)-12-yl2,6-dideoxy-4-O-(2,6-dideoxy-3-O-methyl-αa-L-arabino-hexopyranosyl)-3-O-methyl-αa-L-arabino-hexopyranoside CAS: #70288-86-7

Ivermectin is conventionally provided in tablet form or for larger animals as pastes and injectable liquids. Generally, animals are treated with relatively large doses of ivermectin on a periodic basis. In the case of dogs and cats, tablets/chewables are given once a month by mouth year round for heartworm prevention. Higher doses are used to eliminate other parasites.

While ivermectin is generally considered safe at recommended dosage levels, if these are exceeded side effects such as tremors, staggering, dilated pupils, loss of body weight or death may occur. As a consequence of normal dosing regimes for ivermectin, the treated animals necessarily receive a relatively large quantity of the drug which is to remain effective for an extended period. This in turn means that shortly after treatment the animal has a very high concentration of ivermectin in its bloodstream, with this concentration tailing off during the remainder of the period. This is to be contrasted with a more preferable treatment protocol wherein a substantially constant level of ivermectin is maintained on a continuing basis.

U.S. Pat. No. 6,190,591 describes a single-extruder process for the production of controlled release particles which may be tableted. Various encapsulants including pharmaceuticals, nutraceuticals, nutritional compounds, biologically active components, flavorants, fragrances, detergents and surface-active compositions are described, at relatively large quantities in the particles of at least 1% and preferably from about 3–50%. Hence, the '591 patent is not concerned with complete feeds, but rather encapsulant particles. The process described in this patent make use of an elongated extruder where water and lipid are successively injected into the barrel, followed by water evaporation from the barrel and final addition of encapsulants. Such equipment is generally not suited to the production of a daily ration feed or similar product, given the need to uniformly distribute an active in the latter type of product.

There is accordingly a need in the art for improved feeds providing ivermectin to domesticated household pets in a manner which will avoid periodic, relatively large ivermectin doses and maintain a substantially constant level of ivermectin in the bloodstreams of the treated pets.

SUMMARY OF THE INVENTION

The present invention overcomes the problems outlined above and provides improved ivermectin-containing daily ration feed products for domesticated household pets such as cats and dogs, and methods of preparing such feeds. Generally speaking, the feeds of the invention are produced by extrusion and contain respective quantities of protein, fat and starch, together with a relatively minor amount of ivermectin. Through use of the feed products of the invention, a household pet consuming the feeds on a daily basis receives a maintenance quantity of ivermectin, so that the therapeutic effects thereof are realized. Normally, the ivermectin should be present in the extruded feeds at a level of at least about 2 μg/kg of feed product, more preferably from about 2–1500 μg/kg of feed product, and most preferably from about 5–1000 μg/kg of feed product. In other types of products within the ambit of the invention, the ivermectin may be present at a level of up to about 0.75% by weight, more preferably up to about 0.5% by weight, and still more preferably up to about 0.1% by weight. Preferably, the ivermectin content of the feeds should be maintained for a period of at least about six months, more preferably at least about nine months, and most preferably from about nine to twenty-four months, at ambient temperature storage conditions.

A wide variety of extruded feeds can be used in the context of the invention. For example, typical dry extruded product having a moisture content of less than about 10% by weight can be produced with added ivermectin. Similarly, semi-moist feeds having a moisture content on the order of 15–30% by weight are also suitable. In extruded feeds of these types, it is preferred that the ivermectin content be substantially uniformly dispersed throughout the feed. Alternately, pillow-type feeds can be produced having a soft, flowable matrix center surrounded by a shell of self-sustaining feed material; in such a case, the ivermectin content may be present only in the soft center matrix. In most cases, the feed products of the invention should contain from about 5–15% by weight moisture (wet basis), 15–30% by weight protein, more preferably from about 18–25% by weight protein; from about 3–24% by weight fat, more preferably from about 5–20% by weight fat; and from about 5–80% by weight starch, more preferably from about 20–50% by weight starch. Generally, the extruded feeds should have a bulk density of from about 30–700 g/l, more preferably from about 140–400 g/l, and a water activity of from about 0.1–0.99, more preferably from about 0.6–0.75.

An important goal of the invention is to provide ivermectin-containing daily ration feeds which when consumed on a daily basis by household pets will establish and maintain a therapeutic amount of ivermectin in the bloodstreams of the animals. In this way, the need for periodic dosing with relatively large amounts of ivermectin is completely avoided, yet the beneficial effects of the drug remain.

To this end, the feeds should have sufficient ivermectin therein so that, when a domesticated household pet consumes the feed at a rate of from about 10–40 g of the feed per kg of the consuming pet's weight, the desired therapeutic amount of ivermectin is achieved.

During extrusion processing in accordance with the invention, starting farinaceous feed ingredients are fed into the elongated barrel of an extruder including at least one elongated, axially rotatable, helically flighted screw with an endmost extrusion die. During passage through the extruder barrel, the ingredients are subjected to elevated temperature, agitation and shear in order to cook the product. In preferred forms of the invention, the starting ingredients are first preconditioned prior to passage into the extruder barrel. Generally, during preconditioning the starting mixture is subjected to a temperature of from about 20–98° C. (more preferably from about 90°–97° C.) for a period of from about 15–600 seconds (more preferably from about 170–190 seconds). The purpose of preconditioning is to initially moisturize and partially cook the starting material prior to entrance thereof into the extruder barrel. Advantageously, the material leaving the preconditioner has a moisture content of from about 10–60% by weight, and more preferably from about 21–23% by weight.

In the extruder, the preconditioned starting material is subjected to conditions of elevated heat, pressure and shear. Normally, the temperature conditions in the barrel are such as to achieve a maximum temperature of from about 20°–175° C., and more preferably from about 65–120° F. Normal maximum pressure conditions are from about 100–3000 psi, and more preferably from about 150–500 psi. Residence times in the extruder barrel usually range from about 3–180 seconds, and more preferably from about 20–40 seconds.

The ivermectin content of the extruded feeds can be added at a variety of locations during the process. One preferred technique is to prepare a dilute ivermectin solution which can be pumped at a known rate into the farinaceous ingredients during processing. For example, the ivermectin liquid may be added at the preconditioner, preferably adjacent the outlet thereof. Alternately, the ivermectin may be injected directly into the extruder barrel during processing. Given the relatively small quantities of ivermectin employed in the feeds, it is generally important that there be sufficient time in the process to adequately mix in the ivermectin substantially uniformly throughout the other ingredients.

DETAILED DESCRIPTION OF THE PREFERRED EMBODIMENTS

The following examples set forth presently preferred methods for the production of ivermectin-containing pet foods and related information. It is to be understood, however, that these examples are provided by way of illustration and nothing therein should be taken as a limitation upon the overall scope of the invention.

EXAMPLE 1

In this example, an ivermectin-containing dog food product was produced using a co-extrusion process. The dry farinaceous ingredients used in this example were (all percentages on a weight basis): wheat flour-14%; rice flour-15%; corn flour-32%; corn gluten meal-12%; poultry meal-8%; brewer's yeast-2%; sodium bicarbonate-0.6%; Thoxyquin-0.1%; potassium sorbate-0.3%; and sugar-5%. The liquid co-extruded mixture contained (all percentages on a weight basis: poultry fat-81.13%; GP (Glutamine Peptide)-11.32%; cheese powder-3.77%; and poultry meal-3.77%.

The extrusion equipment included a Wenger X-85 single screw extruder with a Wenger Model 7 DDC preconditioner. The extruder barrel was made up of a series of interconnected heads. The screw configuration, dies, adaptor parts, preconditioner shafts and beater elements were all Wenger equipment.

In order to effect the desired co-extrusion, a delivery pipe having approximately a 3/8" delivery nipple was inserted into the center of the die so that the liquid portion was directed through the die with a surrounding annulus of the extruded farinaceous mixture. The liquid portion was pumped through the delivery pipe at a rate which was approximately 30% of the extrusion rate of the farinaceous mixture. At the outlet of the extruder die, the product was cut using an knife and respective samples of the cut product were manually crimped using a hand-crimping tool. In this fashion, "pillows" of the pet food were obtained, with an outer farinaceous ingredient shell and an inner flowable filling containing ivermectin.

Following this treatment, the product was dried to a moisture level of less than 10% by weight. Three samples from the dryer were subsequently frozen and another sample was placed in a plastic bag and stored at room temperature, for a period in excess of six months.

The following table sets forth the illustrative preconditioning and extrusion information.

TABLE 1

| DRY RECIPE INFORMATION | | |
|---|---|---|
| Dry Recipe Rate | kg/hr | 93 |
| Feed Screw Speed | rpm | 11 |
| PRECONDITIONING INFORMATION | | |
| Preconditioner Speed | rpm | 485 |
| Steam Flow to Preconditioner | kg/hr | 8 |
| Water Flow to Preconditioner | kg/hr | 21 |
| Preconditioner Discharge Temp. | ° C. | 66 |
| EXTRUSION INFORMATION | | |
| Extruder Shaft Speed | rpm | 516 |
| Extruder Motor Load | % | 75 |
| Control/Temperature 2nd Head | ° C. | 40 |
| Control/Temperature 3rd Head | ° C. | 51 |
| Control/Temperature 4th Head | ° C. | 39 |
| Control/Temperature 5th Head | ° C. | 48 |
| Control/Temperature 7th Head | ° C. | 45 |
| FINAL PRODUCT INFORMATION | | |
| Extruder Discharge Density | kg/m$^3$ | 350 |

The products resulting from this test were analyzed to determine the content of ivermectin in the samples. In this analysis, each feed sample was ground in a Retsch mill at low speed using a 2 mm grating screen, so that the ground material would pass through a #10 mesh screen. A total of six samples, three frozen and three stored at room temperature, were processed. In each case, three 37.5 g of a sample was placed in a 250 ml bottle and 100 ml of methanol was added. The bottle was capped, the sample was sonicated for 20 minutes and shaken for 1 hour. 40 ml of the extract was added to a centrifuge tube and centrifuged for 5 minutes at 2000 rpm. 20 ml of the supernatant solution was then passed through a alumina column. The first five ml was rejected and the remainder of the liquid through the column was collected as a purified sample. 2 ml of the purified sample was mixed with a 5 ml mixture of acetonitrile:water (1:1), and a solid phase extraction (SPE) was performed in accordance with the procedure described in Doherty et al., *Analytical Chemists International*, 81:869(4) (1998). 2 ml of the working, 1% ivermectin sample standard was also run through the SPE procedure to determine if any loss of ivermectin was taking place.

All samples from the SPE treatment were evaporated under nitrogen using an analytical evaporator with a water bath temperature of 50° C. The dried samples were reconstituted in 2 ml of HPLC mobile phase for analysis. Two samples were also prepared using 2 ml of the working standard ivermectin solution (containing 0.42 µg/ml) and were run before and after the feed samples.

The HPLC setup consisted of the following:

Gilson 712 HPLC System Controller

Gilson 305 pump, 231 sample injector, 401 dilutor and 115 UV detector

Jones Chromatography column heater set at 30° C.

| HPLC Analytical column | Symmetry $C_{18}$, 5µ, 4.6 × 350 mm |
| --- | --- |
| Mobile Phase | Acetonitrile/methanol/water 53/35/7 |
| Flow rate | 1 mL/minute |
| UV Detection | 245 nm |

The results of the HPLC analyses (two injections of each feed sample and two injections of the working standard solution) confirmed that the pet food samples contained very close to the expected content (0.42 µg/kg) of ivermectin. In particular, the average ivermectin content of the three frozen and the ambient-stored samples was 0.43 µg/kg. This demonstrated that storage conditions (frozen versus ambient) had little effect upon ivermectin potency, and an excellent ivermectin stability.

EXAMPLE 2

In this example, an ivermectin-containing dog food was prepared using a Wenger TX-85 twin screw extruder equipped with a Model 16 Wenger DDC preconditioner. The dry ingredients fed to the extruder included (all percentages by weight basis): wheat middlings-18%; meat and bone meal-18%; soybean meal-18%; and corn-46%. In this run, two liquid dispersions were used which contained (all percentages by weight basis): first mixture, propylene glycol-11 lbs and water-11 lbs; second mixture, propylene glycol-48.82%; water-48.82%; red No. 40 dye-1.86%; and ivermectin solution-0.50%. The amount of ivermectin used was calculated to provide a dose of approximately 1121.1 µg of ivermectin per kg of the dog food on a dry basis. The extruder barrel was made up of interconnected heads. The rotating elements within the barrel included extruder shafts and other elements. The extruder was equipped with dies and adaptors, inserts, and a cutting knife with knife blades was used. The foregoing components as well as the preconditioners shafts and beater elements were all Wenger equipment.

In the process, the dry ingredients were fed to the preconditioner where steam and water was added to moisturize and partially precook the mixture. This preconditioned material was then fed to the inlet of the extruder in the usual fashion. The first liquid mixture was added to the outlet end of the preconditioner for passage into the extruder barrel along with the preconditioned material, over a period of about 11 minutes. Thereafter, the colored, ivermectin-containing liquid mixture was added over a period of about 22 minutes. Finally, additional quantities of the first water/propylene glycol liquid mixture was again added, over about 11 minutes. After extrusion, the product was dried in a Wenger dryer operating at 115° C., followed by a cooler pass. The dryer discharge moisture was 6.25%, wb.

Samples were collected of the colored ivermectin-containing dispersion, the raw material mixture, preconditioned material leaving the preconditioner and extruded samples.

The following table sets forth illustrative preconditioning and extrusion conditions.

TABLE 2

| DRY RECIPE INFORMATION | | |
| --- | --- | --- |
| Dry Recipe Moisture | % w b | 9.56 |
| Dry Recipe Density | kg/m³ | 570 |
| Dry Recipe Rate | kg/hr | 2618 |
| Feed Screw Speed | rpm | 205 |
| PRECONDITIONING INFORMATION | | |
| Preconditioner Speed | rpm | 250 |
| Steam Flow to Preconditioner | kg/hr | 224 |
| Water Flow to Preconditioner | kg/hr | 362 |
| Preconditioner Additive 1 Rate | kg/hr | 57 |
| Preconditioner Discharge Temp. | ° C. | 90 |
| EXTRUSION INFORMATION | | |
| Extruder Shaft Speed | rpm | 700 |
| Extruder Motor Load | % | 67 |
| Steam Flow to Extruder | kg/hr | 84 |
| Water Flow to Extruder | kg/hr | 112 |
| Control/Temperature 1st Head | ° C. | 50/57 |
| Control/Temperature 2nd Head | ° C. | 50/86 |
| Control/Temperature 3rd Head | ° C. | 40/52 |
| Control/Temperature 4th Head | ° C. | 40/75 |
| Head/Pressure | kPa | 900 |
| Knife Drive Speed | rpm | 905 |
| FINAL PRODUCT INFORMATION | | |
| Extruder Discharge Density | kg/m³ | 368 |
| Extruder Performance | | Stable |

The dog food from this run was fed ad libitum to an intact female mixed breed dog weighing about 10 kg. On day 7, blood was drawn from the dog four hours after eating and stored in an anti-coagulant tube with calcium EDTA in a refrigerator. Seven days later, the same dog was again fed the ivermectin-containing feed ad libitum and blood was collected four hours post-feeding. This sample was also refrigerated in the same fashion as the first sample.

The blood samples were then analyzed to determine the content of ivermectin therein, using HPLC. The procedure used was described in Dickinson, *Journal of Chromatography*, 58:250–257 (1990). In this procedure, 0.5 ml of each blood sample was purified using solid phase extraction (SPE) cartridges and dissolved in a small volume of mobile phase for injection onto the HPLC column. The method has a limit of detection of about 2 ng/ml and uses an internal standard. After preparation of the internal standard, a standard curve is constructed using ivermectin-spiked blood samples. A known 1% ivermectin sample was used as the primary standard.

The blood samples from the dog were then analyzed for ivermectin content with HPLC peak heights corrected using the internal standard. The HPLC setup consisted of the following:

Gilson 712 HPLC System Controller
Gilson 305 pump, 231 sample injector, 401 dilutor and 115 UV detector
Jones Chromatography column heater set at 56° C.

| | |
|---|---|
| HPLC Analytical column: | Coulter-Beckman UltraSphere XL $C_{18}$, $3\mu$, 4.6 × 70 mm |
| Mobile Phase: | Acetonitrile/methanol/water 49/33/18 |
| Flow Rate: | 1 mL/minute |
| UV Detection: | 245 nm |

The results of this study demonstrated that the dog blood samples contained ivermectin in the range of about 5–8 ng/ml.

EXAMPLE 3

In this example a series of extrusion runs were performed to determine the consistency of metering of ivermectin into a dog food mixture during extrusion. In each case, the farinaceous mixture included the following ingredients (all percentages on a weight basis): corn-35.93%; poultry meal-28.94%; rice-22.95%; corn gluten meal-11.98%; vitamin premix-0.10%; and mineral premix-0.10%. Three ivermectin-containing liquids were prepared, containing: Recipe #1, propylene glycol-8.60 pounds; water-8.60 pounds; red #40 dye-160 grams; ivermectin solution-0.212 ml; Recipe #2, propylene glycol-8.60 pounds; water-8.60 pounds; red #40 dye-160 grams; ivermectin solution-0.433 ml; Recipe #3, propylene glycol-8.60 pounds; water-8.60 pounds; red #40 dye-160 grams; ivermectin solution-1.279 ml. In each run 8.0 kg of a respective ivermectin recipe was added to the farinaceous ingredients at the exit of the preconditioner, prior to entering the extruder barrel. The recipes were added at a rate equal to 2% of the farinaceous mixture rate. The target for the runs using Recipe #1 was 6 $\mu$g ivermectin/kg of feed; for runs using Recipe #2, 12 $\mu$g/kg; and for runs using Recipe #3, 36 $\mu$g/kg.

The extruder system employed was a Wenger model TX 57 twin screw extruder with a model 2 DDC preconditioner. The extruder barrel was equipped with an extrusion die, a knife assembly was used to cut extrudate.

The following table sets forth the preconditioning and extrusion information collected during this series of runs. In runs 101–103, Recipe #1 was used; in runs 104–106, Recipe #2 was used; and in runs 107–109, Recipe #3 was used. As the extrudates emerged from the die, they were cut using the knife assembly and dried in a Wenger multiple-pass drier. Samples were collected at 15 minutes, 30 minutes and 45 minutes from the preconditioner, extruder and drier.

TABLE 3

| | | 101 | 102 | 103 | 104 | 105 | 106 | 107 | 108 | 109 |
|---|---|---|---|---|---|---|---|---|---|---|
| DRY RECIPE INFORMATION: | | | | | | | | | | |
| Dry Recipe Density | kg/m³ | 494 | 494 | 494 | 494 | 494 | 494 | 494 | 494 | 494 |
| Dry Recipe Rate | kg/hr | 400 | 400 | 400 | 390 | 392 | 390 | 387 | 397 | 392 |
| Feed Screw Rate | rpm | 48 | 53 | 55 | 49 | 52 | 52 | 56 | 54 | 54 |
| PRECONDITIONING INFORMATION: | | | | | | | | | | |
| Preconditioner Speed | rpm | 350 | 350 | 350 | 350 | 350 | 350 | 350 | 350 | 350 |
| Steam Flow to Preconditioner | kg/hr | 36 | 35.8 | 35.9 | 36.1 | 35.9 | 35.8 | 36 | 36.1 | 35.9 |
| Water Flow to Preconditioner | kg/hr | 48 | 48.1 | 48.3 | T47.7 | 47.9 | 48.1 | 48 | 48.2 | 48.1 |
| Preconditioner Additive 1 Rate | kg/hr | 8 | 7.9 | 8.05 | 7.8 | 7.95 | 7.84 | 8.12 | 8.03 | 8.02 |
| Preconditioner Discharge Temp. | ° C. | 86 | 85 | 85 | 86 | 86 | 86 | 85 | 85 | 85 |
| Moisture Entering Extruder | % w b | 16.26 | 17.04 | 19.14 | 18.96 | 16.47 | 18.18 | 16.14 | 18.97 | 18.98 |
| EXTRUSION INFORMATION: | | | | | | | | | | |
| Extruder Shaft Speed | rpm | 426 | 427 | 425 | 427 | 426 | 426 | 426 | 426 | 425 |
| Extruder Motor Load | % | 53 | 45 | 61 | 54 | 52 | 67 | 49 | 51 | 52 |
| Steam Flow to Extruder | kg/hr | 12 | 13.1 | 709 | 8 | 7.9 | 8 | 8.1 | 8 | 8 |
| Water Flow to Extruder | kg/hr | 24 | 24 | 24.1 | 24 | 24 | 23.8 | 24 | 24 | 23.9 |
| Control/Temp. 1st Head | ° C. | 40/52 | 40/52 | 40/52 | 40/53 | 40/55 | 40/52 | 40/53 | 40/55 | 40/54 |
| Control/Temp. 2nd Head | ° C. | 60/60 | 60/60 | 60/59 | 60/60 | 60/60 | 60/59 | 60/59 | 60/59 | 60/60 |
| Control/Temp. 3rd Head | ° C. | 80/79 | 80/80 | 80/81 | 80/80 | 80/80 | 80/81 | 80/80 | 80/80 | 80/79 |
| Control/Temp. 4th Head | ° C. | 60/67 | 60/67 | 60/67 | 60/65 | 60/65 | 60/66 | 60/65 | 60/65 | 60/64 |
| Head/Pressure | kPa | 1710 | 1600 | 1980 | 1660 | 1770 | 1910 | 1960 | 1980 | 1830 |
| Knife Drive Speed | rpm | 1324 | 1324 | 1325 | 1492 | 1443 | 1493 | 1493 | 1492 | 1491 |
| FINAL PRODUCT INFORMATION: | | | | | | | | | | |
| Extruder Discharge Moisture | % w b | 20.43 | 19.79 | 20.4 | 21.32 | 21.46 | 21.97 | 22.12 | 22.83 | 22.71 |
| Extruder Discharge Density | kg/m³ | 312 | 374 | 338 | 400 | 349 | 352 | 336 | 336 | 400 |
| Extruder Performance | | Stable | Stable | Stable | Stable | Stable | Stable | Stable | Stable | Stable |
| Dried Product Moisture | % w b | 2.75 | 2.12 | 4.67 | 9.38 | 9.74 | 10.18 | 7.45 | 9.4 | 8.0 |

The dried samples were analyzed to determine ivermectin content, using the technique described in Example 1. The results from the Recipe #1, #2 and #3 runs were averaged, with the following results. For the Recipe #1 runs (101–103), the ivermectin content was 6.02 $\mu$/kg (dry basis); for the Recipe #2 runs (104–106), the ivermectin content was 11.99 $\mu$/g (dry basis); and for the Recipe #3 runs (107–109), the ivermectin content was 35.98 $\mu$/g (dry basis). This confirms that the processing technique of this Example gives extremely close ivermectin contents, as compared with the pre-extrusion goals.

We claim:

1. A daily ration feed for domesticated household pets comprising an extruded feed product containing respective quantities of protein, fat and starch, said extruded product feed having a quantity of ivermectin therein, said feed being formulated to provide and maintain a therapeutically effective amount of ivermectin in the bloodstream of the animal when said daily ration feed is fed to said animal on a daily basis.

2. The feed of claim 1, said ivermectin being substantially uniformly dispersed throughout the extruded product feed.

3. The feed of claim 1, said ivermectin being within a soft, flowable matrix, said matrix surrounded by a shell of self-sustaining edible feed material.

4. The feed of claim 1, said extruded product feed being selected from the group consisting of dry and semi-moist extruded product feeds.

5. The feed of claim 1, said extruded product feed having sufficient ivermectin therein so that, when a domesticated household pet consumes the feed at a rate of from about 10–40 g of extruded feed product per kg of the animal's weight, said therapeutically effective amount is achieved.

6. The feed of claim 1, said extruded product feed being a dry pet food product and having a moisture content of less than about 10% by weight.

7. The feed of claim 1, said extruded product being a semi-moist pet food product and having a moisture content of from about 15–30% by weight.

8. The feed of claim 1, said domesticated household pets selected from the group consisting of dogs and cats.

9. The feed of claim 1, said quantity of ivermectin being from about 2–1500 μg of ivermectin therein per kg of said extruded feed product.

10. The feed of claim 1, said ivermectin being co-extruded with said daily ration feed.

* * * * *